Dec. 13, 1960    J. W. BUFFINGTON    2,964,007
DIP SOLDERING MACHINE

Filed Feb. 16, 1956    4 Sheets-Sheet 1

INVENTOR.
JOHN W. BUFFINGTON
BY
Stuart R. Peterson
ATTORNEY

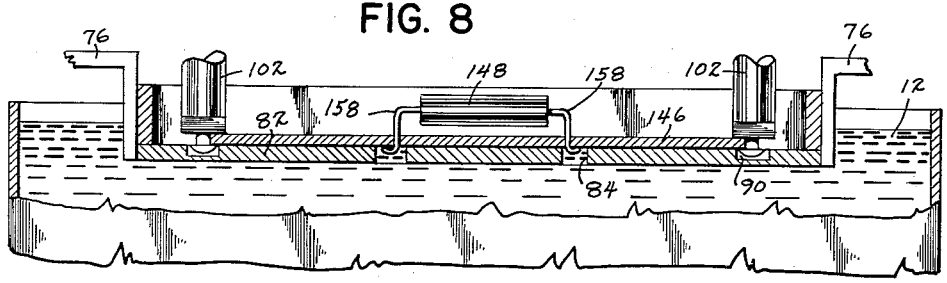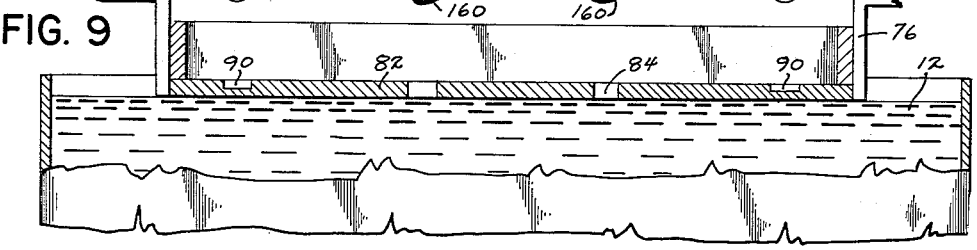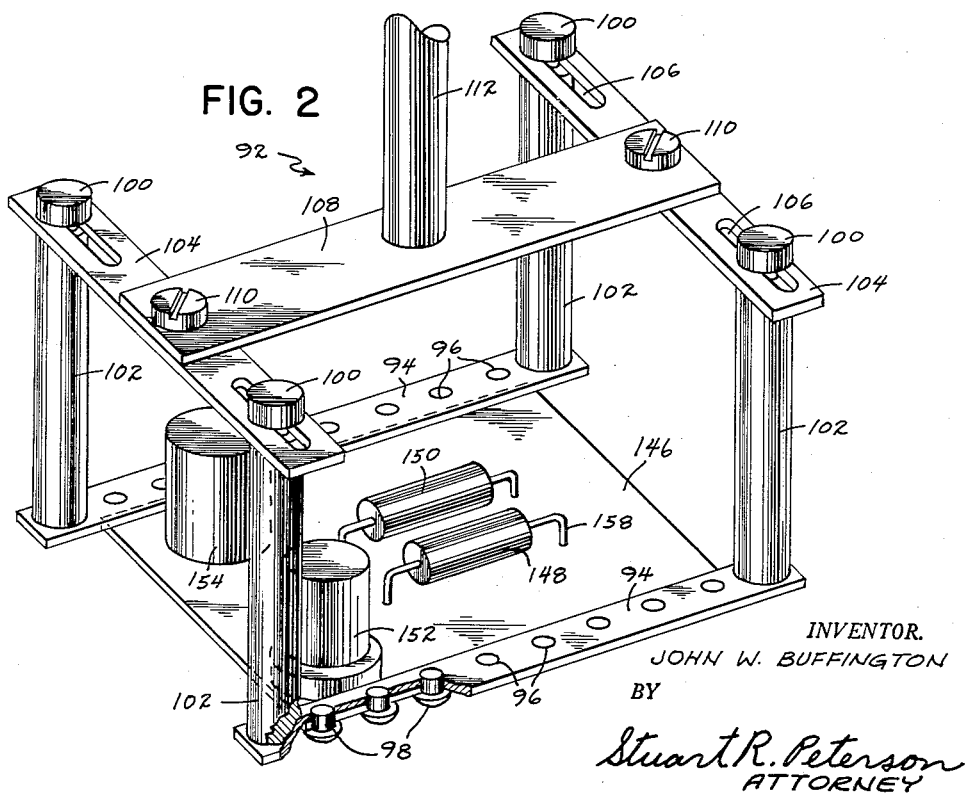

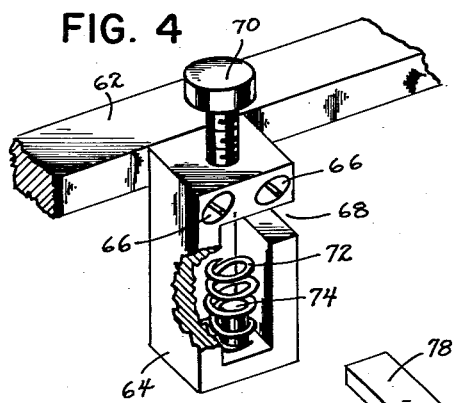
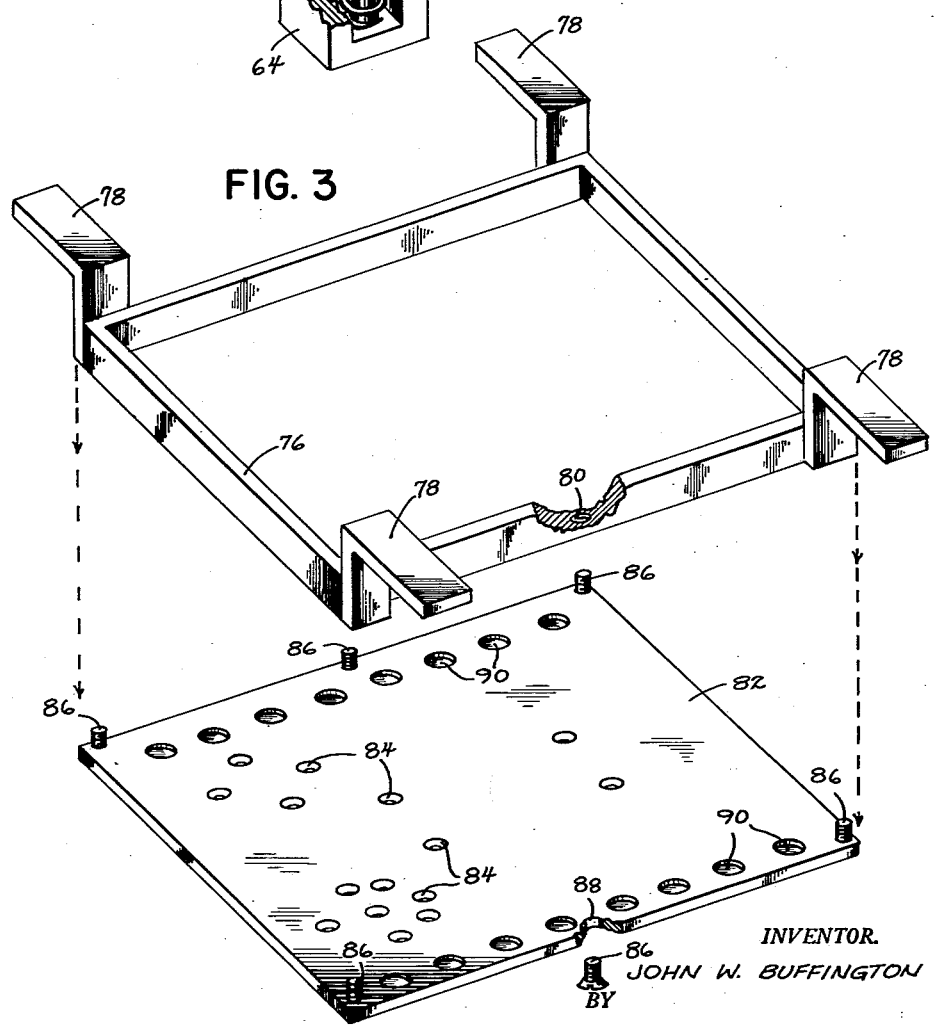

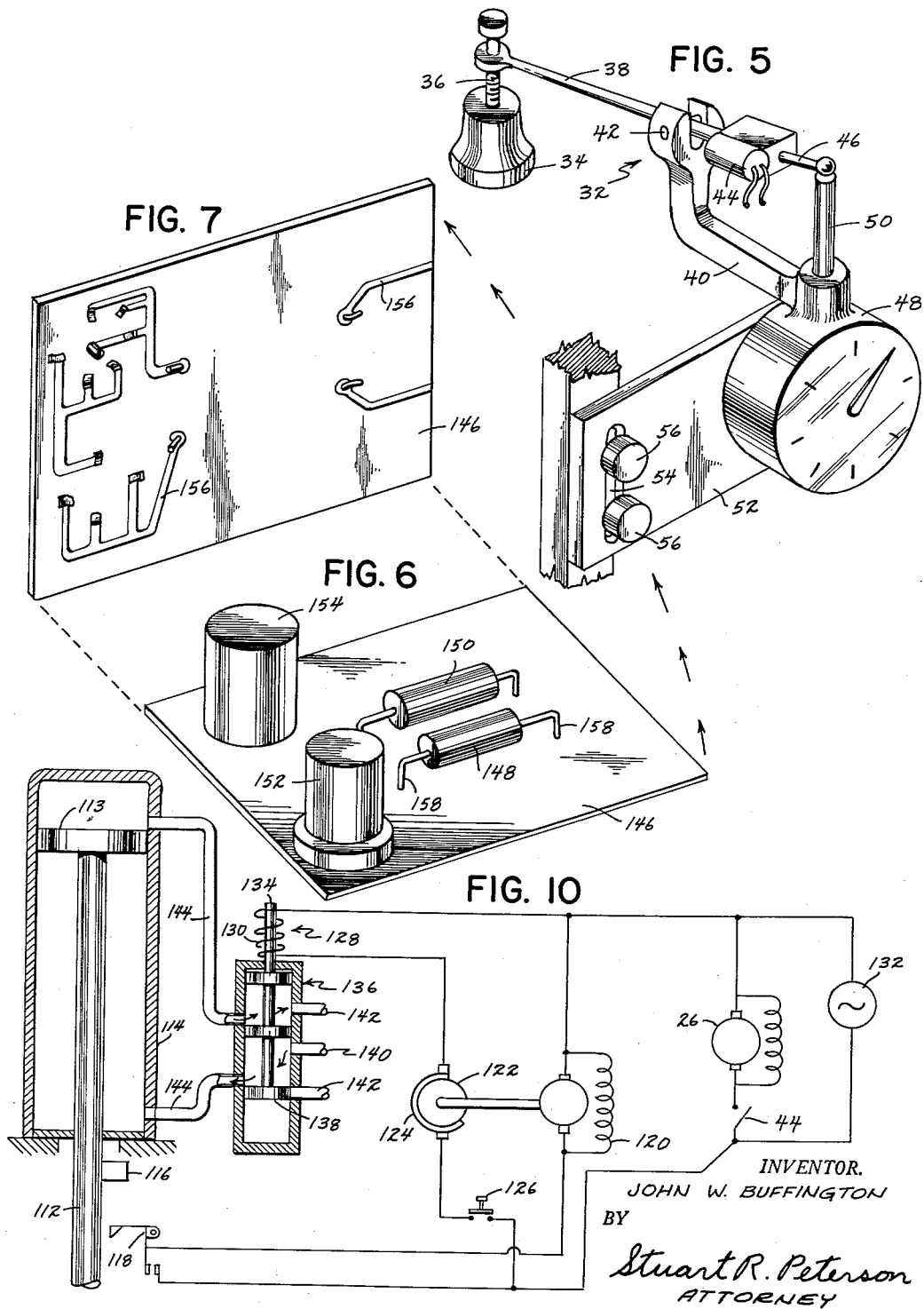

United States Patent Office 2,964,007
Patented Dec. 13, 1960

---

2,964,007

DIP SOLDERING MACHINE

John W. Buffington, Minneapolis, Minn., assignor to General Mills, Inc., a corporation of Delaware Filed Feb. 16, 1956, Ser. No. 565,827

1 Claim. (Cl. 113—126)

This invention relates to dip soldering equipment and pertains more particularly to a machine of the foregoing character which will find especial utility in the making of soldered joints on printed electric circuit boards and the like.

With the advent and development of printed circuitry, conductors on the printed circuit boards have been placed in a very close proximal relationship with each other. Inasmuch as the printed circuit type of board is continually gaining in popularity, a need has arisen for a simple and effective means of performing soldering at desired locations. While dip soldering has been used on occasions for effecting the soldered joints, nonetheless with the close spacing above mentioned there is always the problem that some of the soldering metal will adhere to the board where not wanted. Of course if the solder bridges the conductors then "shorts" are created which render the board inutile and consequently require that it be discarded.

Accordingly one important object of the instant invention is to provide a dip soldering machine capable of performing the required soldering of joints at specific locations without encumbering the board with soldering metal at undesired sites.

Also it is within the purview of the invention to provide a forced selective type of soldering, the structural arrangement causing a predetermined static head to occur which forces the solder onto the desired joint locations.

Another aim of the invention is to provide a dip soldering machine that will produce soldered joints of a uniform character. In this respect it is contemplated that the formation of cold joints will be for all intent and purposes wholly eliminated. Further, it is within the purview of the invention to avoid the formation of dross which would require removal before effective joints can be made.

A further object of the invention is to provide a machine of the above-mentioned nature which will be exceedingly simple in its operation, requiring relatively inexperienced personnel, one that will be inexpensive to manufacture, and finally, a machine that will require little or no maintenance.

Still another object of the invention is to provide a dip soldering machine that will be relatively automatic in its function, thereby requiring little attention from the operator.

Yet another object is to minimize the possibility of panel warpage, this being a distinct advantage where relatively thin circuit boards or cards are utilized.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claim.

In the drawings:

Fig. 2 is a perspective view of the vertically movable head which holds the printed circuit board to be soldered and lowers it into contact with the soldering bath;

Fig. 3 is an exploded perspective view of the template and frame for holding said template which the printed circuit board is moved against in its downward travel into the soldering bath;

Fig. 4 is a perspective detail of one of the bracket guides for yieldably retaining the template and frame of Fig. 3 for movement in a desired vertical direction;

Fig. 5 is a perspective view of the float mechanism utilized in maintaining the solder at a particular level;

Fig. 6 is a perspective view showing the upper side of a printed circuit board having several electrical components mounted thereon;

Fig. 7 is a perspective view showing the bottom of the board pictured in Fig. 6;

Fig. 8 is a fragmentary front elevational view illustrating the performance of a dip soldering operation;

Fig. 9 is a view similar to Fig. 8 but showing the printed circuit board after the dip soldering operation has been completed; and Fig. 10 is a schematic view illustrating the circuitry and the pneumatic control arrangement for conducting a dip soldering cycle.

Figure 1:
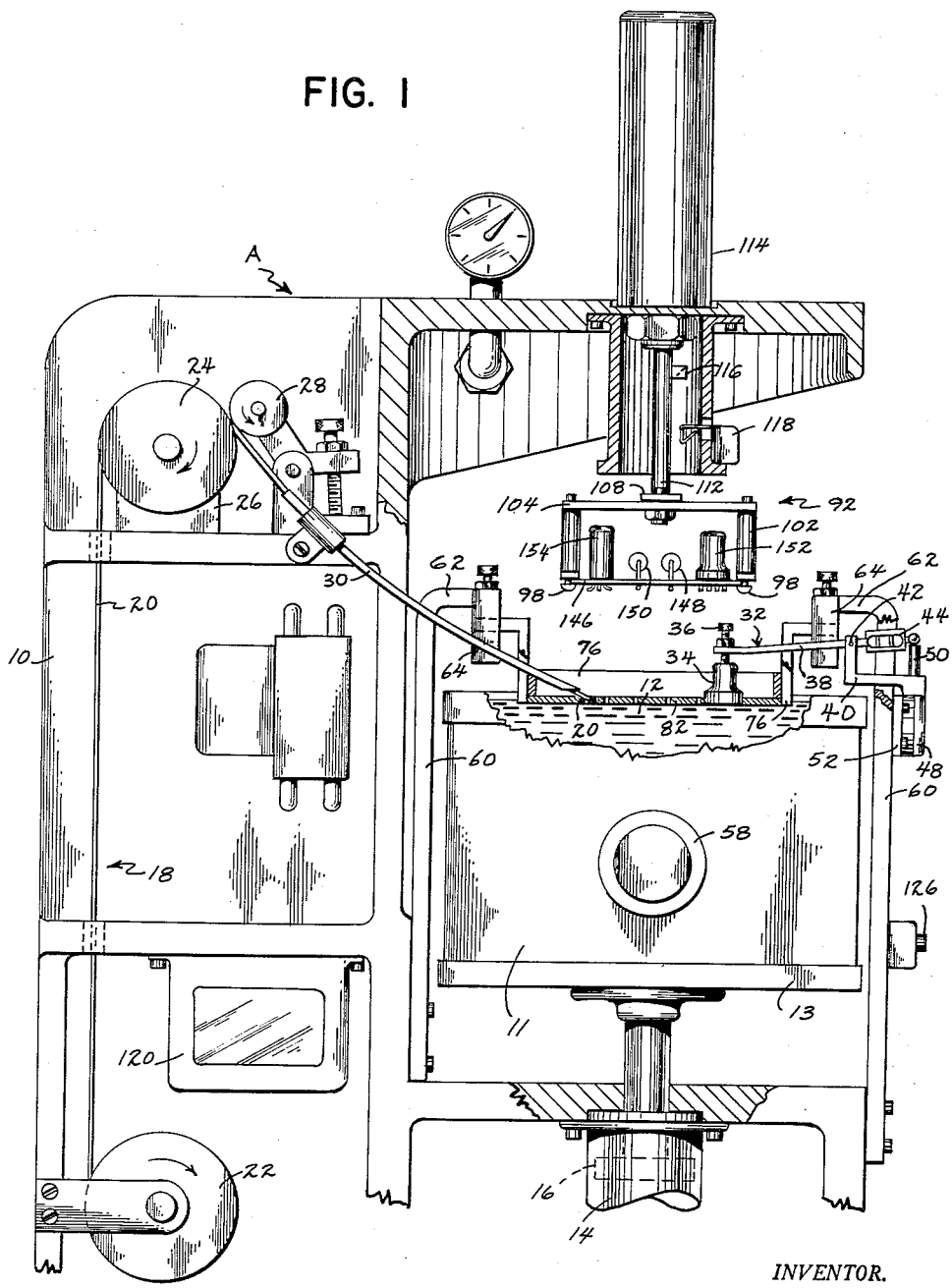
Figure 1 is a side elevational view of the complete dip soldering machine forming the subject matter of the present invention.

Referring in detail to the drawings, the dip soldering machine exemplifying the invention has been designated in its entirety by the character A. The dip soldering machine A comprises a framework 10 and supported on the framework 10 is a soldering pot 11 for containing the molten solder 12, the pot being located on an elevatable platform 13. In order to raise and lower the platform 13 together with the melting pot 11, an air cylinder 14 is disposed therebelow having a piston 16. More will be said hereinafter concerning the specific reasons for raising and lowering the pot 11.

In order to maintain a full quantity of molten solder within the pot 11 there is employed a solder supply mechanism indicated generally by the numeral 18. In order to continually replenish the solder consumed or removed by virtue of the various soldering cycles, there is a rod or strip 20 of metallic solder stored on a rotatable reel 22. The strip 20 is removed from the reel 22 by a driving sheave 24 which is driven by a motor 26 (see Fig. 10). Cooperating with the driving sheave 24 is a grooved roller 28 which directs the strip 20 from the sheave 24 into a guide tube 30. As can be plainly seen from Fig. 1 the lower end of the strip 20 exits from the tube 30 directly into the molten solder bath 12 and the heat of the solder bath of course melts immediately the end of this strip 20.

Since the level of the solder bath should be relatively uniform in effectuation of good soldered joints, the invention envisages the utilization of a float mechanism 32 embracing a float element 34 supported on the lower end of a threaded stud 36. The stud is received at the free end of a lever 38 pivotally mounted to a fixed arm 40 by reason of a pivot pin 42. The lever 38 also carries a mercury switch 44 (see also Fig. 10) which is in circuit with the solder feed motor 26 previously mentioned. The lever 38 is further equipped with an extension 46 which serves to actuate an indicator dial 48 by reason of the extension bearing directly upon the upper end of a plunger rod 50 belonging to the indicator dial. The function of the indicator dial 48 is primarily concerned with the obtaining of a precise indication of the level of the molten solder. To this end the dial can be calibrated into thousandths of an inch and the movement of the float 34 will reflect any changes in level into the dial via the lever 38. There is provided a mounting plate 52 which supports the fixed arm 40 and also the dial 48. In order to render the mounting plate and hence the entire float mechanism 32 adjustable in a vertical direction, the mounting plate has a slot 54 through which extends a clamping bolt 56 so that the mounting plate 52 may be retained at a preferred elevation. Thus, by virtue of the foregoing, an accurate controlling of the solder level is realized during the non-soldering portion of the cycle, and during the actual soldering the level is raised slightly, but always the same amount because the same degree of immersion will occur for a given head, template and panel immersion.

As is important with all soldering operations, the pot 11 should be maintained at a preferred temperature and to this end there is employed a temperature control 58. It is not seen necessary to describe this temperature control in any great detail other than to say that the temperature responds to the molten bath and controls the electric heating coils (not shown) so that they are energized periodically to maintain the requisite temperature.

The framework 10 has as an integral part thereof four upright stud members labelled 60, each pair of which support at their upper ends a horizontal member 62. A portion of one of these horizontal members 62 is clearly visible in the perspective detail depicted in Fig. 4. Also as best viewed in Fig. 4, it will be observed that the horizontal member 62 supports bracket guides or cages 64, there being a total of four of these guides. Each guide 64 is provided with mounting screws 66 which secure the guide to its associated horizontal member 62. As can also be discerned from Fig. 4, the bracket guides 64 each have an entrance slot 68 for a purpose presently to be explained. The guide is further equipped with a keeper screw 70 as well as a coil spring 72 and a limit stop 74.

In Fig. 3 a rectangular frame 76 is pictured in complete detail, this frame having four laterally extending ears 78, each of which is received in a guide 64. Through the agency of the slots 68 it will be understood that these ears 78 can readily be introduced into the respective guides 64 and once the introduction thereinto has taken place, then tightening of the keeper screws 70 will assure their retention or captivity. However, the ears 78 are permitted to move vertically downwardly against the coil springs 72 in a manner hereinafter set forth. Considerably more will be said concerning this movement and it is best reserved for the ensuing operational description. The lower edge of the rectangular frame 76 is provided with six tapped apertures 80, one of which is visible in Fig. 3.

In order to solder in a highly selective manner a template 82, preferably of stainless steel, is formed with a plurality of apertures or perforations 84 arranged in a specific pattern corresponding to the locations of the joints to be made. Here again, though, this feature will be better understood as the description progresses. In order to secure the template 82 to the rectangular frame 76 so as to be movable in unison therewith, a plurality of mounting screws 86 which extend through apertures 88 are utilized, these screws 86 finding engagement with the tapped apertures 80 previously referred to in conjunction with the description of the rectangular frame 76. For a purpose presently to be made manifest, a series of linearly distributed recesses 90 are formed in the upper side of the template 82. However, these recesses do not extend all the way through the thickness of the template and thus do not permit any molten solder to pass upwardly therethrough.

As best viewed in Fig. 2 a vertically movable head 92 is incorporated into the dip soldering machine, this head performing a very important function as will be presently explained. Concerning the specific construction of the head 92, it can be seen from this figure (Fig. 2) that there is utilized a pair of longitudinal side strips 94 containing a series of apertures 96 through which pass a plurality of rivets 98.

Holding the longitudinal strips 94 in a spaced parallel relationship with each other are four relatively long screw members 100 having circumscribed thereabout spacing tubes 102. The screws 100 are anchored to a pair of transverse end strips 104 by reason of a plurality of slots 106. In this way, it will be appreciated, the longitudinal strips 94 can be spaced apart any preferred distance. The transverse strips 104 are in turn held in their spaced relationship by means of a central longitudinal strip 108, there being utilized a pair of screws 110 for this purpose.

The head 92 is rendered vertically movable by virtue of its attachment to the lower end of a piston rod 112, the piston rod having at its upper end a piston 113 reciprocably disposed in an air cylinder 114. Through the agency of a projection 116 on the rod 112 a switch 118 disposed in the path of said projection 116 may be actuated so as to energize a timer 120. While the timer 120 can assume a variety of designs, for the purpose of illustrating the invention, it is depicted as including a disk 122 having a segmented slip ring 124 disposed about its periphery (Fig. 10).

A starting switch 126, as best noted in Fig. 10, is in circuit relationship with the slip ring 124 and also a solenoid 128 having a coil 130. In order to energize the coil 130 there is provided a source of power 132 which can also be used, if desired, to provide energization for the solder feed motor 26. Disposed for reciprocation within the coil 130 is an armature 134.

Still making reference to Fig. 10, it will be discerned that there is a three-way control valve 136 having its piston 138 actuated by the movement of the armature 134. The control valve 136 is connected to a pressure line 140 and also to a pair of exhaust lines 142 as well as to a pair of supply lines 144 leading directly to the air cylinder 114. Thus it will be appreciated that the control valve 136 is instrumental in controlling the up and down movement of the piston 113 and hence the head 92.

The head 92 supports a panel which, as earlier mentioned, may constitute a printed electrical circuit board. The panel 146 is releasably carried by the head 92 merely by causing the panel to be inserted in stirrup-like fashion under the longitudinal side strips 94 of said head and on top of the lower heads of the rivets 98. In this manner, it should be pointed out that the rivets 98 provide actually what is a groove arrangement for the accommodation of panel 146 and the rivets can be installed by the ultimate purchaser of the dip soldering machine A, thereby permitting the user of the machine to locate the rivets 98 at locations best suited for his particular needs. However, it is to be distinctly observed that considerable latitude is incorporated into the head 92 as far as the reception of various width panels owing to the provision of the slots 106 disposed in the transverse strips 104. Continuing with the description of the panel 146 (Fig. 6), it will be noted that several electrical components 148, 150, 152, and 154 are mounted on the upper face of the panel whereas a certain amount of very simple printed circuit wiring 156 is disposed in known manner on the under side of this panel. While each of the components is equipped with leads, we will be only concerned as far as this description, with leads 158 on the component 150 which we will presume to be a resistor.

Before describing the operation of the dip soldering machine A, it should be explained that the template 82 is normally disposed so that its rests upon the top surface of the solder. This relationship which the template 82 assumes with respect to the solder is best illustrated in Fig. 9 and serves two very important purposes. First of all, the template, suggestively of stainless steel as previously mentioned, will become uniformly heated by the heat transmitted upwardly from the solder bath and as will soon be made clear, the elimination of "cold" soldered joints will be effected due to this uniform heating of the template. The second reason for having the template rest on the top of the solder bath is to avoid the formation of dross which will not form as long as no oxygen is available. The mere contact of the template 82 with the solder precludes the entrance of oxidation to its under surface.

While the above description is believed sufficiently adequate to provide a lucid understanding of the operation of the dip solder machine, nonetheless it is felt that running through a particular cycle will be of added benefit. In this regard, the panel 146 is appropriately fluxed on its bottom side at the locations where the soldering joints are to be made. Also the template 82 is drilled with the various apertures 84 in a pattern corresponding with the locations of the soldered joints to be made on the under side of the panel 146. Having done these preliminary operations, the template 82 is mounted to the under side of the rectangular frame 76 and the panel 146 is slid under the strips 94 so that its lower side will have its marginal edges in engagement with the bottom heads of the rivets 98. Suitable stops should be provided by which the sliding of the panel 146 is precisely governed so that when the panel is lowered against the template 82 there will be the proper registry between the desired joint locations and the apertures 84. If the solder 12 has solidified from the previous work, then of course it must be remelted. This, quite obviously, may constitute the first step to be taken. To safeguard against damage to the machine through premature operation when the solder 12 is in a solid state, the platform 13 should always be lowered before the previous shutdown. This is the primary office of the air cylinder 14, although such feature is of assistance should repairs need to be made.

To inaugurate an actual dip soldering operation, the operator will depress the starting switch 126 and the control valve 136 will have its piston 138 moved downwardly because of the concomitant energization of the solenoid 128. The movement of the piston 138 will cause compressed air to flow from the pressure line 140 to the air cylinder 114 via the upper supply line 144 as viewed in Fig. 10. Introduction of the compressed air against the upper face of the piston 113 within the air cylinder 114 will cause said piston to move downwardly and since the head 92 is carried at the lower end of the piston rod 112 belonging to the piston 113, the head will be lowered. In its downward travel the projection 116 will strike the switch 118 so as to initiate a timing action by reason of energization of the timer 120. The relationship between the projection 116 and the switch 118 will be such that the timing action will be started just as the panel 146 is lowered sufficiently into the solder bath. It is to be noted that it is the lowering of the head 92 that is responsible for the template 82 together with its frame 76 moving downwardly into the solder bath. There does not need to be very much immersion since it is only necessary that the lower face of the panel 146 be exposed in the desired regions to the solder. However, if the lower face of the panel 146 is merely brought even with the upper surface of the solder bath, then only soldering due to capillary attraction can take place. Therefore it is more desirable that a head be formed and by lowering the bottom face of the panel 146 beneath the upper surface of the solder, such a static head is provided. As a matter of general interest, although the operation is certainly not restricted thereto, an immersion to a depth of $\frac{1}{32}$ to $\frac{1}{16}$ of an inch has been very satisfactory, but up to, say, $\frac{1}{8}$ of an inch may be desired at times.

Such an immersed condition is pictured in Fig. 8 and it will be observed from this figure that molten solder is forced upwardly into the apertures 84 so as to envelope the lower extremities of the leads 158 on the resistor 148. Since these locations have been previously fluxed, then the solder forms metallic globules or joints designated by the numeral 160, as shown in Fig. 9. Fig. 9, it may be explained, is the position of the panel 146 after the head has been elevated a certain extent. Inasmuch as a certain time should transpire while the component leads are in contact with the molten solder in order to provide a good soldered joint 160, the timer 120 by virtue of its segmented slip ring 124 is capable of providing this desired amount of time and serves to duly deenergize the solenoid 128 at the end of the requisite amount of time. It goes without saying that a similar joint 160 will be formed at the situs of each aperture 84.

Thus deenergization of the solenoid 128 will cause the piston 138 to move back into the position shown in Fig. 10 and in doing this, compressed air is delivered to the under side of the piston 113 so as to elevate the side, the air being transmitted via the pressure line 140 through the lower supply line 144. While this is taking place, air is bled from the upper side of the piston 113 via the upper supply line 144 and the upper exhaust line 142.

Inasmuch as the depth of immersion is an important factor to consider, it will be appreciated that the float mechanism 32 is exceedingly desirable so as to control the feed of the solder strip 20 so that a relatively uniform level is maintained. If the level of the solder bath were permitted to fluctuate, then, of course, the depth to which the panel 146 is urged would vary and nonuniform joints 160 would be the result.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

What is claimed is:

A dip soldering machine comprising a receptacle for containing molten solder, a template having a preferred arrangement of apertures disposed therein corresponding to the desired soldered joint locations, means for mounting said template for vertical movement relative to said molten solder, a pneumatic cylinder having a piston reciprocably mounted therein, a head movable with said piston relative to said receptacle, said head being designed to detachably hold a panel to be soldered so that when the panel is lowered against the upper side of said template, said panel will be moved sufficiently far into said solder thereby forcing molten solder to engage the panel at the locations where soldered joints are desired, a control valve for supplying air to said pneumatic cylinder, said control valve being reciprocably operable to furnish air into said cylinder alternately above and below said piston thus moving said piston both up and down through its vertical path, a solenoid for operating said control valve, a timer in circuit with said solenoid, a switch for actuating said timer, a piston rod associated with said piston and supporting said head, and a projection on said piston rod engageable with said switch thereby to cause the timer to function when the panel has been lowered to a proper depth within the molten solder and to effect withdrawal of said panel after a prescribed length of time.

References Cited in the file of this patent
UNITED STATES PATENTS

| 640,136 | Hume | Dec. 26, 1899 |
| 646,616 | Allen | Apr. 3, 1900 |
| 937,524 | Hartlove | Oct. 19, 1909 |
| 1,413,014 | Eisinga | Apr. 18, 1922 |
| 1,725,960 | Jones | Aug. 27, 1929 |
| 1,947,689 | Young | Feb. 20, 1934 |
| 2,002,795 | Przyborowski | May 28, 1935 |

(Other references on following page)

UNITED STATES PATENTS

| Number | Name | Date |
|---|---|---|
| 2,182,364 | Smith | Dec. 5, 1939 |
| 2,506,047 | Thomas | May 2, 1950 |
| 2,508,200 | Tarlton | May 16, 1950 |
| 2,583,267 | Jones | Jan. 22, 1952 |
| 2,619,063 | Anderson | Nov. 25, 1952 |
| 2,675,780 | McLaughlin et al. | Apr. 20, 1954 |
| 2,764,953 | Mullan | Oct. 2, 1956 |
| 2,770,875 | Zimmerman | Nov. 20, 1956 |
| 2,771,049 | Fish | Nov. 20, 1956 |
| 2,771,050 | Zimmerman | Nov. 20, 1956 |
| 2,877,731 | Allen | Mar. 17, 1959 |

OTHER REFERENCES

Electrical Manufacturing, July 1953, pp. 97–109, 304, 306, 308, "Automatic Assembly of Electronic Equipment."